(12) United States Patent
Hirakata

(10) Patent No.: US 11,356,049 B2
(45) Date of Patent: Jun. 7, 2022

(54) MOTOR DRIVE DEVICE, MOTOR DRIVE METHOD, AND COMPUTER-READABLE MEDIUM HAVING RECORDED THEREON MOTOR DRIVE PROGRAM

(71) Applicant: FUJI ELECTRIC CO., LTD., Kanagawa (JP)

(72) Inventor: Masaki Hirakata, Hino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 17/183,390

(22) Filed: Feb. 24, 2021

(65) Prior Publication Data

US 2021/0313922 A1 Oct. 7, 2021

(30) Foreign Application Priority Data

Apr. 1, 2020 (JP) .............................. JP2020-066318

(51) Int. Cl.
*H02P 29/024* (2016.01)
*H02P 29/68* (2016.01)
*H02P 27/08* (2006.01)

(52) U.S. Cl.
CPC .......... *H02P 29/0241* (2016.02); *H02P 27/08* (2013.01); *H02P 29/68* (2016.02)

(58) Field of Classification Search
CPC ...... H02P 3/00; H02P 3/06; H02P 3/12; H02P 3/16; H02P 3/22; H02P 29/024; H02P 29/68; H02P 27/00; H02P 27/04; H02P 27/06; H02P 27/08; H02P 27/085; H02P 1/00; H02P 1/04; H02P 1/18; H02P 1/24; H02P 1/26; H02P 1/423; H02P 1/46; H02P 1/465; H02P 6/00; H02P 6/12; H02P 6/28; H02P 7/00; H02P 7/29; H02P 29/60; H02P 21/00; H02P 21/22
See application file for complete search history.

(56) References Cited

U.S. PATENT DOCUMENTS 10,340,834 B2 7/2019 Uchida
2013/0127383 A1 5/2013 Kawamura

FOREIGN PATENT DOCUMENTS

| EP | 3399645 B1 * | 9/2020 | ............. F25B 31/02 |
|----|--------------|--------|--------------------------|
| JP | 2009284747 A | 12/2009 | |
| JP | 2012065425 A | 3/2012 | |
| JP | 2018152986 A | 9/2018 | |

* cited by examiner

*Primary Examiner* — Antony M Paul

(57) ABSTRACT

Provided is a motor drive device comprising a motor control unit that controls a plurality of upper arm-side switching elements and a plurality of lower arm-side switching elements provided to an inverter for driving a motor; a current determination unit that determines whether a motor current flowing through at least one switching element of the plurality of upper arm-side switching elements and the plurality of lower arm-side switching elements is equal to or smaller than a threshold value; and a short-circuit control unit that performs switching between all-on of the plurality of upper arm-side switching elements and all-on of the plurality of lower arm-side switching elements, on condition that the motor current is equal to or smaller than the threshold value, in a short-circuiting operation of alternately switching all-on of the plurality of upper arm-side switching elements and all-on of the plurality of lower arm-side switching elements.

20 Claims, 10 Drawing Sheets

MOTOR DRIVE DEVICE, MOTOR DRIVE METHOD, AND COMPUTER-READABLE MEDIUM HAVING RECORDED THEREON MOTOR DRIVE PROGRAM

The contents of the following Japanese patent application are incorporated herein by reference:
NO. 2020-066318 filed in JP on Apr. 1, 2020.

BACKGROUND

1. Technical Field

The present invention relates to a motor drive device, a motor drive method, and a computer-readable medium having recorded thereon a motor drive program.

2. Related Art

Patent Document 1 discloses "alternately executing a first switching control of turning on all of switching elements, which are connected to a positive electrode-side of a direct current electric power source, of a plurality of pairs of switching elements and turning off all of switching elements connected to a negative electrode-side of the direct current electric power source and a second switching control of turning on all of the switching elements, which are connected to the negative electrode-side of the direct current electric power source, of the plurality of pairs of switching elements and turning off all of the switching elements connected to the positive electrode-side of the direct current electric power source, when a rotational speed of a motor is higher than a predetermined rotational speed" (paragraph [0006]). Patent Document 2 discloses "a drive device of a permanent magnet synchronous motor including an inverter which a direct current voltage of a direct current electric power source is input thereto and outputs a voltage to the permanent magnet synchronous motor, a direct current voltage detecting means for detecting the direct current voltage that is input to the inverter, and an inverter control means for controlling a voltage that is output from the inverter, wherein the inverter control means controls the inverter to perform at least one of operations of opening and short-circuiting a line between the inverter and the permanent magnet synchronous motor, based on an output of a regenerative voltage detected by the direct current voltage detecting means" (paragraph [0006]). Patent Document 3 discloses "upon shift of an inverter from a gate disconnected state to a three phase-on state, when it is determined that a current flows in a diode of an upper arm by using a phase current of each phase, a drive device turns on a switching element of the upper arm to shift the inverter to an upper arm three phase-on state or when it is determined that a current flows in a diode of a lower arm by using the phase current of each phase, the drive device turns on a switching element of the lower arm to shift the inverter to a lower arm three phase-on state" (paragraph [0008]).

PRIOR ART DOCUMENTS

Patent Document

Patent Document 1: Japanese Patent Application Publication No. 2012-65425
Patent Document 2: Japanese Patent Application Publication No. 2009-284747
Patent Document 3: Japanese Patent Application Publication No. 2018-152986

In a high-load state of a motor, when a motor winding is short-circuited by all-phase short-circuiting of upper arm-side switching elements or lower arm-side switching elements, a current that exceeds a current flowing during normal motor drive may transiently flows in the switching elements. In this state, when all-phase short-circuiting of the upper arm and all-phase short-circuiting of the lower arm are switched, a high surge voltage may be generated.

SUMMARY

A first aspect of the present invention provides a motor drive device. The motor drive device may comprise a motor control unit for controlling a plurality of upper arm-side switching elements and a plurality of lower arm-side switching elements provided to an inverter for driving a motor. The motor drive device may comprise a current determination unit for determining whether a motor current flowing through at least one switching element of the plurality of upper arm-side switching elements and the plurality of lower arm-side switching elements is equal to or smaller than a threshold value. The motor drive device may comprise a short-circuit control unit for performing switching between all-on of the plurality of upper arm-side switching elements and all-on of the plurality of lower arm-side switching elements, on condition that the motor current is equal to or smaller than the threshold value, in a short-circuiting operation of alternately switching all-on of the plurality of upper arm-side switching elements and all-on of the plurality of lower arm-side switching elements.

The short-circuit control unit may be configured not to perform the switching, on condition that the motor current exceeds the threshold value, in the short-circuiting operation.

The current determination unit may be configured to determine whether the motor current flowing through all the switching elements of the plurality of upper arm-side switching elements and the plurality of lower arm-side switching elements is equal to or smaller than the threshold value.

The short-circuit control unit may not be configured to perform the switching, on condition that a temperature of at least one switching element of the plurality of upper arm-side switching elements and the plurality of lower arm-side switching elements is equal to or lower than a reference temperature, in the short-circuiting operation.

The short-circuit control unit may not be configured to perform the switching, on condition that a minimum temperature of an on-state switching element of the plurality of upper arm-side switching elements and the plurality of lower arm-side switching elements is equal to or lower than the reference temperature, in the short-circuiting operation.

The current determination unit may be configured to set the threshold value higher when a temperature of at least one switching element of the plurality of upper arm-side switching elements and the plurality of lower arm-side switching elements is higher.

The current determination unit may be configured to set the threshold value higher when the minimum temperature of an on-state switching element of the plurality of upper arm-side switching elements and the plurality of lower arm-side switching elements is higher.

The current determination unit may be configured to determine whether the motor current flowing through a wire between the inverter and the motor is equal to or smaller than the threshold value.

A second aspect of the present invention provides a motor drive method. The motor drive method may comprise controlling a plurality of upper arm-side switching elements and a plurality of lower arm-side switching elements provided to an inverter for driving a motor. The motor drive method may comprise determining whether a motor current flowing through at least one switching element of the plurality of upper arm-side switching elements and the plurality of lower arm-side switching elements is equal to or smaller than a threshold value. The motor drive method may comprise performing switching between all-on of the plurality of upper arm-side switching elements and all-on of the plurality of lower arm-side switching elements, on condition that the motor current is equal to or smaller than the threshold value, in a short-circuiting operation of alternately switching all-on of the plurality of upper arm-side switching elements and all-on of the plurality of lower arm-side switching elements.

A third aspect of the present invention provides a motor drive program that is executed by a computer. The motor drive program may cause the computer to function as a motor control unit for controlling a plurality of upper arm-side switching elements and a plurality of lower arm-side switching elements provided to an inverter for driving a motor. The motor drive program may cause the computer to function as a current determination unit for determining whether a motor current flowing through at least one switching element of the plurality of upper arm-side switching elements and the plurality of lower arm-side switching elements is equal to or smaller than a threshold value. The motor drive program may cause the computer to function as a short-circuit control unit for performing switching between all-on of the plurality of upper arm-side switching elements and all-on of the plurality of lower arm-side switching elements, on condition that the motor current is equal to or smaller than the threshold value, in a short-circuiting operation of alternately switching all-on of the plurality of upper arm-side switching elements and all-on of the plurality of lower arm-side switching elements.

The summary clause does not necessarily describe all necessary features of the present invention. The present invention may also be a sub-combination of the features described above.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
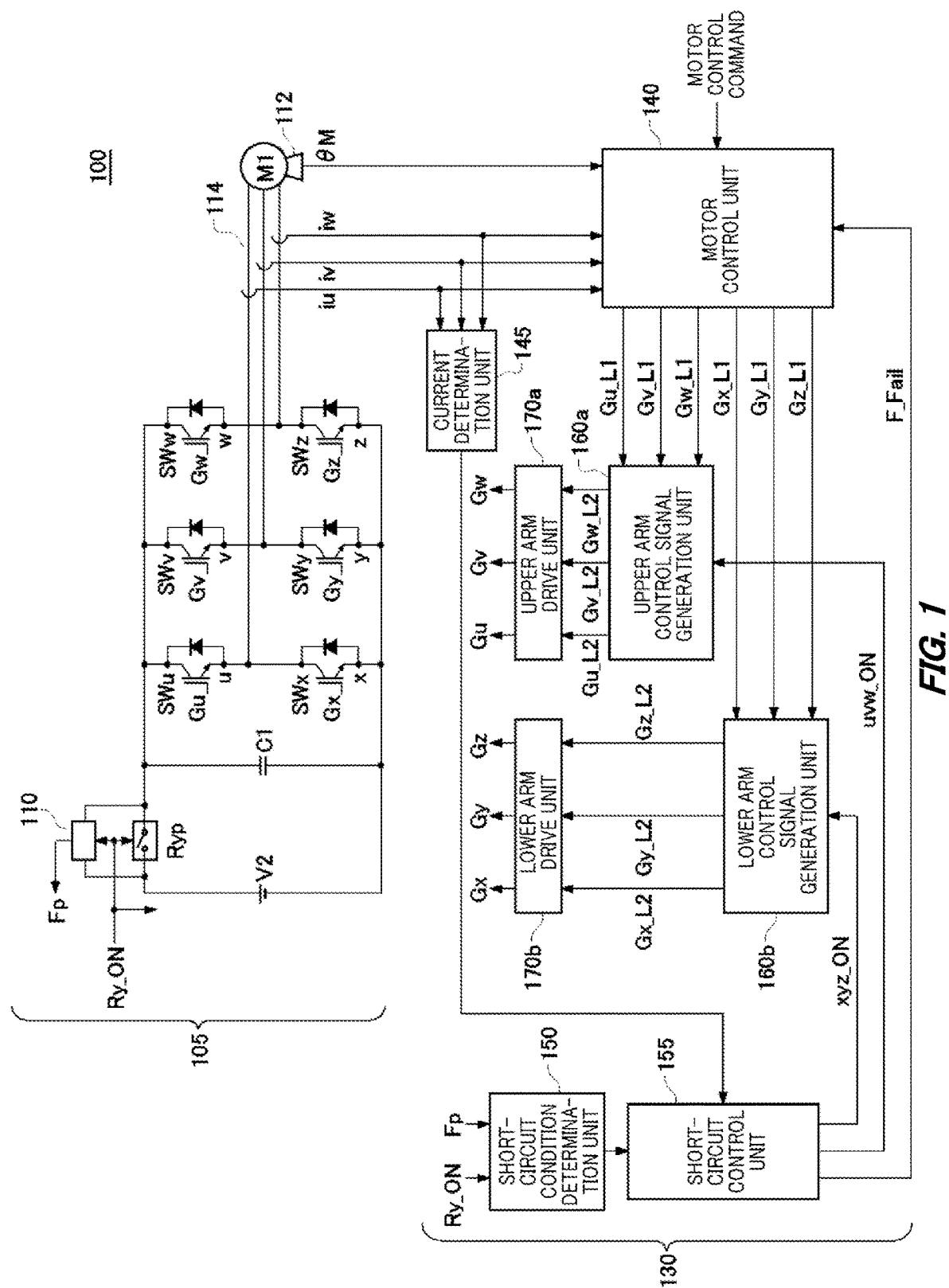
FIG. 1 shows a configuration of an electrical-machinery system in accordance with a present embodiment.

FIG. 1 shows a configuration of an electrical-machinery system 100 in accordance with a present embodiment. In a short-circuiting operation of alternately switching all-phase short-circuiting (all-on) of a plurality of upper arm-side switching elements SWu to SWw and all-phase short-circuiting (all-on) of a plurality of lower arm-side switching elements SWx to SWz, the electrical-machinery system 100 enables switching of all-phase short-circuiting between the upper and lower arm-side switching elements, on condition that a motor current flowing through the switching elements is equal to or smaller than a threshold value. Thereby, the electrical-machinery system 100 can prevent a surge voltage exceeding a withstand voltage of a switching element from being generated by switching the switching element from an on-state to an off-state in a state where a large current is flowing through the switching element.

The electrical-machinery system 100 comprises a motor M1, an inverter 105, a magnetic pole position detector 112, a current detector 114, and a motor drive device 130. The motor M1 is a three-phase permanent magnet (PM) motor, for example. Alternatively, the motor PM may also have a different number of phases and may be another type of a motor that rotates as electric power is supplied thereto.

The inverter 105 is connected to the motor M1 and drives the motor M1. The inverter 105 includes an electric power source V2, a relay Ryp, a relay state detector 110, a smoothing capacitor C1, upper arm-side switching elements SWu to SWw, and lower arm-side switching elements SWx to SWz. The electric power source V2 is connected between a positive side and a negative side of DC bus bars of the inverter 105, and generates electric power that is supplied to the motor M1.

The relay Ryp is provided between the electric power source V2 and an inverter main body consisting of the smoothing capacitor C1 and the switching elements SWu to SWz. The relay Ryp switches whether to connect the electric power source V2 to the smoothing capacitor C1 and the inverter main body, according to a relay-on signal Ry_ON that is input from an outside.

The relay state detector 110 is connected to terminals on both sides of the relay Ryp, and detects whether the relay Ryp is normally operating. The relay state detector 110 of the present embodiment inputs a relay-on signal Ry_ON, and when the relay Ryp is in a disconnected state during a time period for which the relay-on signal Ry_ON instructs that the relay Ryp is in an on-state, the relay state detector 110 outputs a relay state signal Fp (for example, a logic H) indicating that the relay Ryp is abnormal. The relay state detector 110 may detect whether the relay Ryp is in an on-state by detecting whether a small current flows between both terminals of the relay Ryp or may detect whether the relay Ryp is in an on-state by detecting whether a potential difference between both terminals of the relay Ryp is within an error range. The relay state detector 110 can detect not only that the relay Ryp is not an on-state but also that the relay Ryp itself falls off.

The smoothing capacitor C1 is connected between the positive-side and negative-side DC bus bars on a side closer to the inverter main body than the relay Ryp. The smoothing capacitor C1 stabilizes a DC bus bar voltage, and absorbs variation in current that is supplied to the inverter main body-side.

The upper arm-side switching element SWu and the lower arm-side switching element SWx may each a switching element such as an IGBT, a MOSFET or the like. Main terminals of the upper arm-side switching element SWu and main terminals of the lower arm-side switching element SWx are connected in corresponding order in parallel with the smoothing capacitor C1 between the positive-side DC bus bar and the negative-side DC bus bar, and a first phase terminal (U-phase terminal) of the motor M1 is connected between the upper arm-side switching element SWu and the lower arm-side switching element SWx. Main terminals of the upper arm-side switching element SWv and main terminals of the lower arm-side switching element SWy and main terminals of the upper arm-side switching element SWw and main terminals of the lower arm-side switching element SWz are connected between the DC bus bars, similarly to the upper arm-side switching element SWu and the lower arm-side switching element SWx, and a second phase terminal (v-phase terminal) of the motor M1 is connected between the upper arm-side switching element SWv and the lower arm-side switching elements SWy, and a third phase terminal (w-phase terminal) of the motor M1 is connected between the upper arm-side switching element SWw and the lower arm-side switching elements SWz.

Each of the upper arm-side switching elements SWu to SWw and each of the lower arm-side switching elements SWx to SWz may have a freewheel diode reversely connected to the switching element main body. Here, in a case where each of the upper arm-side switching elements SWu to SWw and each of the lower arm-side switching elements SWx to SWz are MOSFETs, the freewheel diodes may also be parasitic diodes.

The magnetic pole position detector 112 detects a magnetic pole position of the motor M1. As an example, the magnetic pole position detector 112 may be a rotating speed sensor or a rotational angle sensor, etc. that detects a current rotational angle θM of the motor M1 by detecting a magnetic field from a permanent magnet provided to a rotor of the motor M1.

One or multiple current sensors 114 are provided to some or all of one or multiple wires connected to the motor M1, and detect a motor current flowing through a wire between the switching element of each phase in the inverter 105 and the motor M1. The current sensor 114 may be a current sensor that measures a current in a non-contact manner with a measurement target wire, such as a CT (Current Transformer) method.

Here, the current sensor 114 for each phase can measure motor current flowing through an on-state switching element of the upper arm-side switching element and the lower arm-side switching element of the corresponding phase. For example, when the upper arm-side switching element SWu of u-phase is in an on-state and the lower arm-side switching element SWx of u-phase is in an off-state, the u-phase current sensor 114 can measure a current measurement value iu indicated by a voltage corresponding to a current flowing between the upper arm-side switching element SWu and the motor M1. When the upper arm-side switching element SWu of u-phase is in an off-state and the lower arm-side switching element SWx of u-phase is in an on-state, the u-phase current sensor 114 can measure a current measurement value iu indicated by a voltage corresponding to a current flowing between the lower arm-side switching element SWx and the motor M1.

Note that, the electrical-machinery system 100 may also detect the motor currents flowing through the upper arm-side switching elements SWu to SWw and the lower arm-side switching elements SWx to SWz by using other means. For example, in a case where the upper arm-side switching elements SWu to SWw and the lower arm-side switching elements SWx to SWz each have a sense emitter terminal, the electrical-machinery system 100 may detect a magnitude of the motor current flowing through the corresponding switching element, based on a magnitude of the current flowing through the sense emitter terminal.

The motor drive device 130 is connected to the inverter 105, and controls the inverter 105. The motor drive device 130 includes a motor control unit 140, a current determination unit 145, a short-circuit condition determination unit 150, a short-circuit control unit 155, arm control signal generation units 160a and 160b, and arm drive units 170a and 170b.

The motor control unit 140 is connected to the magnetic pole position detector 112 and one or multiple current detectors 114, and controls the plurality of upper arm-side switching elements SWu to SWw and the plurality of lower arm-side switching elements SWx to SWz provided to the inverter 105. The motor control unit 140 may be implemented by a CPU such as a microcontroller or a processor for motor control, a computer including the CPU, or the like. Alternatively, the motor control unit 140 may also be implemented by a hardware circuit. The motor control unit 140 receives a motor control command for designating torque for driving the motor M1, and generates and outputs gate drive commands Gu_L1, Gv_L1, Gw_L1, Gx_L1, Gy_L1, and Gz_L1 for driving the motor M1 so as to generate torque corresponding to the motor control command, based on the measurement value of the motor current of each phase detected by one or multiple current detectors 114. The gate drive commands Gu_L1, Gv_L1, Gw_L1, Gx_L1, Gy_L1, and Gz_L1 are, in order, gate drive commands corresponding to the upper arm-side switching element SWu, the upper arm-side switching element SWv, the upper arm-side switching element SWw, the lower arm-side switching element SWx, the lower arm-side switching element SWy, and the lower arm-side switching element SWz. In the present embodiment, the motor control unit 140 outputs a gate drive command for instructing the inverter 105 to generate a three-phase AC current for rotating the motor M1 with the torque designated by the motor control command.

In the present embodiment, the motor control unit 140 is connected to the short-circuit control unit 155, and receives a fail signal F_Fail (fail by a logic H) indicating that an abnormality occurs and a short-circuiting operation is in progress. Receiving the fail signal, the motor control unit 140 stops the three-phase AC drive by the normal operation with the gate drive commands Gu_L1 to Gz_L1 set to the logic L, irrespective of the above, during the short-circuiting operation, and entrusts the control on all the switching elements SWu to SWz to the short-circuit control unit 155.

The current determination unit 145 is connected to one or multiple current detector 114 and determines whether the motor current flowing through at least one switching element of the plurality of upper arm-side switching elements SWu to SWw and the plurality of lower arm-side switching elements SWx to SWz is equal to or smaller than a threshold value. A determination result of the current determination unit 145 is used as at least one of conditions for determining whether it is possible to switch all-on of the plurality of upper arm-side switching elements SWu to SWw and all-on of the plurality of lower arm-side switching elements SWx to SWz in the short-circuiting operation.

In the present embodiment, the current determination unit 145 determines whether the motor current flowing through all the switching elements of the plurality of upper arm-side switching elements SWu to SWw and the plurality of lower arm-side switching elements SWx to SWz is equal to or smaller than the threshold value. Here, the larger the motor current flowing through the switching element is, the higher a surge voltage is which is generated when the switching element is switched from an on-state to an off-state. Therefore, in a case where all the switching elements have substantially the same characteristics, the surge voltage that is generated when the switching element is switched from an on-state to an off-state can be suppressed to a withstand voltage or lower when the motor current flowing through all the switching elements is equal to or smaller than the threshold value.

The short-circuit condition determination unit 150 is input with a relay-on signal Ry_ON and a relay state signal Fp, and determines whether a short-circuit condition for causing the inverter 105 to perform a short-circuiting operation is satisfied. When it is determined that the short-circuit condition is satisfied, the short-circuit condition determination unit 150 instructs the short-circuit control unit 155 to perform the short-circuiting operation. In the present embodiment, the short-circuit condition determination unit 150 determines that the short-circuit condition is satisfied, on condition (sufficient condition) that the relay Ryp is not normally operating, i.e., the relay state signal Fp is in a disconnected state even though the relay-on signal Ry_ON instructs an on-state.

Here, during rotation of the motor M1, when the electric power source V2 and the smoothing capacitor C1 are disconnected such as due to a breakdown or falling off of the relay Ryp, the smoothing capacitor C1 may be excessively charged by reflux from the motor M1, so that a voltage between the DC bus bars may rise abnormally. In order to prevent this, the short-circuit condition determination unit 150 determines that the short-circuit condition is satisfied, on condition that the relay Ryp is not normally operating. Instead of this or in addition to this, the short-circuit condition determination unit 150 may also determine that the short-circuit condition is satisfied, when another condition is satisfied. For example, the short-circuit condition determination unit 150 may determine that the short-circuit condition is satisfied, on condition that the voltage between the DC bus bars exceeds a maximum allowable voltage.

The short-circuit control unit 155 is connected to the current determination unit 145 and the short-circuit condition determination unit 150. The short-circuit control unit 155 controls the inverter 105 to perform the short-circuiting operation, in response to receiving an instruction to perform the short-circuiting operation from the short-circuit condition determination unit 150. In the present embodiment, the short-circuit control unit 155 outputs an upper arm all-phase on-command uvw_ON (all-on by the logic H) for instructing whether or not to turn on all of the upper arm-side switching elements SWu to SWw, a lower arm all-phase on-command xyz_ON (all-on by the logic H) for instructing whether or not to turn on all of the lower arm-side switching elements SWx to SWz, and a fail signal F_Fail (fail by the logic H) indicating that an abnormality occurs and the short-circuiting operation is in progress.

When not performing the short-circuiting operation, the short-circuit control unit 155 instructs not to turn on all of the upper arm-side switching elements SWu to SWw and the lower arm-side switching elements SWx to SWz by setting the upper arm all-phase on-command uvw_ON and the lower arm all-phase on-command xyz_ON to the logic L. When performing the short-circuiting operation, the short-circuit control unit 155 performs control of alternately switching all-on of the plurality of upper arm-side switching elements SWu to SWw and all-on of the plurality of lower arm-side switching elements SWx to SWz by alternately setting the upper arm all-phase on-command uvw_ON and the lower arm all-phase on-command xyz_ON to the logic H.

Here, the short-circuit control unit 155 performs switching between all-on of the plurality of upper arm-side switching elements SWu to SWw and all-on of the plurality of lower arm-side switching elements SWx to SWz, in the short-circuiting operation, on condition that the motor current is equal to or smaller than the threshold value. The short-circuit control unit 155 does not also perform the switching, in the short-circuiting operation, on condition that the motor current exceeds the threshold value.

The upper arm control signal generation unit 160a and the lower arm control signal generation unit 160b (also referred to as "arm control signal generation unit 160") are connected to the motor control unit 140 and the short-circuit control unit 155. The upper arm control signal generation unit 160a receives the upper arm-side gate drive commands Gu_L1 to Gw_L1 from the motor control unit 140 and the upper arm all-phase on-command uvw_ON from the short-circuit control unit 155, outputs the gate drive commands Gu_L1 to Gw_L1 as gate drive commands Gu_L2 to Gw_L2 during a normal operation (uvw_ON=L) and outputs the upper arm all-phase on-command uvw_ON as gate drive commands Gu_L2 to Gw_L2 during a short-circuiting operation (Gu_L1 to Gw_L1=L).

Similarly, the lower arm control signal generation unit 160b receives the lower arm-side gate drive commands Gx_L1 to Gz_L1 from the motor control unit 140 and the lower arm all-phase on-command xyz_ON from the short-circuit control unit 155, outputs the gate drive commands Gx_L1 to Gz_L1 as gate drive commands Gx_L2 to Gz_L2 during a normal operation (xyz_ON=L) and outputs the lower arm all-phase on-command xyz_ON as the gate drive commands Gx_L2 to Gz_L2 during a short-circuiting operation (Gx_L1 to Gz_L1=L).

The upper arm drive unit 170a and the lower arm drive unit 170b (also referred to as "arm drive unit 170") are connected to the upper arm control signal generation unit 160a and the lower arm control signal generation unit 160b. The upper arm drive unit 170a insulates and amplifies each of the gate drive commands Gu_L2 to Gw_L2 received from the upper arm control signal generation unit 160a so that reference potentials (i.e., potentials of u to w points in the figure) of the upper arm-side switching elements SWu to SWw are to be reference potentials, and supplies the same to gates Gu to Gw of the upper arm-side switching elements SWu to SWw. The lower arm drive unit 170b amplifies the gate drive commands Gx_L2 to Gz_L2 received from the lower arm control signal generation unit 160b, and supplies the same to gates Gx to Gz of the lower arm-side switching elements SWx to SWz. Here, when the gate drive commands Gx_L2 to Gz_L2 use the negative-side DC bus bar as a reference potential, insulation of the gate drive commands is not required.

Figure 2:
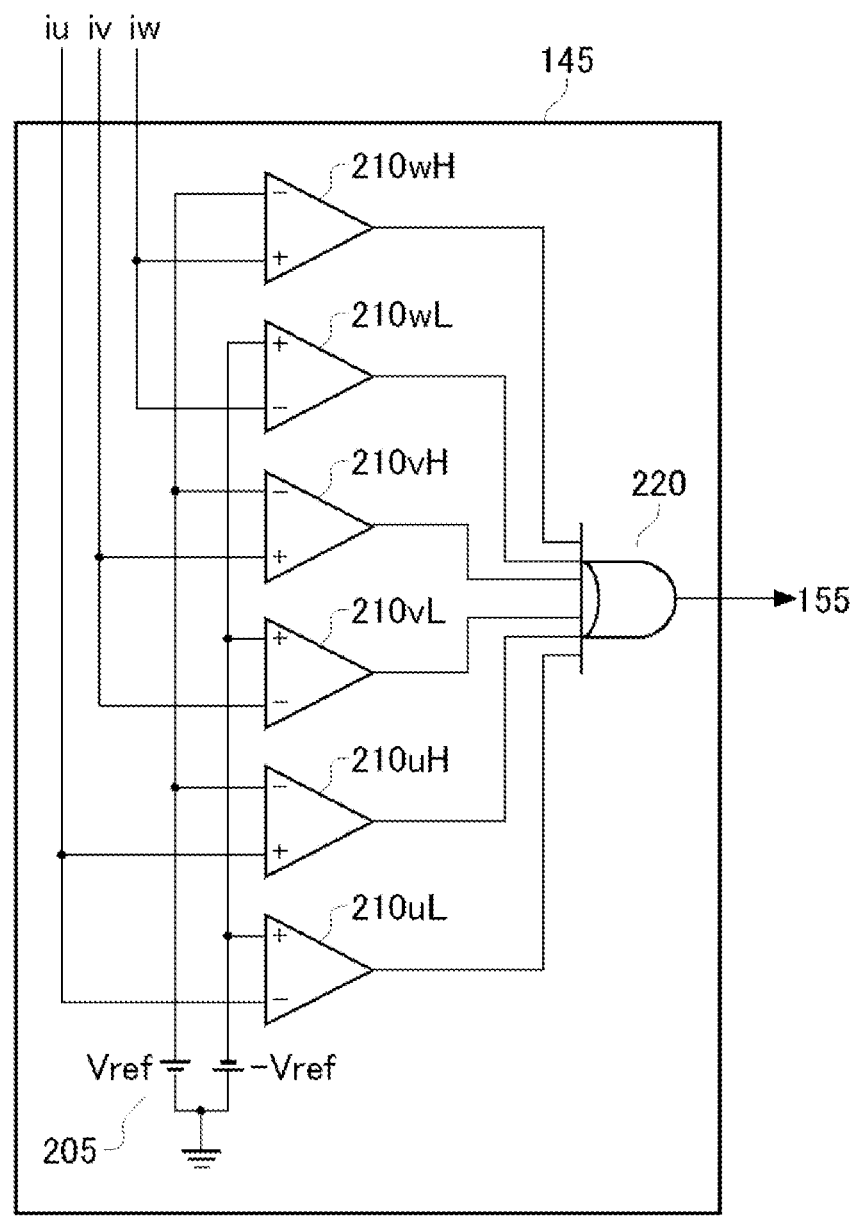
FIG. 2 shows an example of a configuration of a current determination unit in accordance with the present embodiment.

FIG. 2 shows an example of a configuration of the current determination unit 145 in accordance with the present embodiment. The current determination unit 145 includes a threshold value generation unit 205, a plurality of comparators 210uH to 210wH, a plurality of comparators 210uL to 210wL, and an OR circuit 220. The threshold value generation unit 205 generates a positive threshold value voltage Vref and a negative threshold value voltage −Vref. The threshold value voltages correspond to voltages of current measurement values that are output by the current sensor 114 when the motor current having a magnitude corresponding to the current threshold value flows.

A negative threshold value voltage −Vref and a current measurement value iu corresponding to the motor current flowing through the u-phase current detector 114 are each input to a positive-side terminal and a negative-side terminal of the comparator 210uL, and the comparator 210uL outputs the logic H to the OR circuit 220 when the current measurement value iu <−Vref, and outputs the logic L to the OR circuit 220 when the current measurement value iu ≥−Vref. The current measurement value iu corresponding to the motor current flowing through the u-phase current detector 114 and a positive threshold value voltage Vref are each input to a positive-side terminal and a negative-side terminal of the comparator 210uH, and the comparator 210uH outputs the logic H to the OR circuit 220 when the current measurement value iu>Vref, and outputs the logic L to the OR circuit 220 when the current measurement value iu≤Vref. The comparator 210vH and the comparator 210vL of v-phase and the comparator 210wH and the comparator 210wL of w-phase perform similar comparisons for the v-phase and the w-phase and output comparison results to the OR circuit 220.

The OR circuit 220 takes a logical add of the comparison results from the comparators 210uH to 210wH and the comparators 210uL to 210wL, and outputs the logical add as a determination result of the motor current. Here, when all of the comparators 210uH to 210wH and the comparators 210uL to 210wL output the logic L, i.e., when −Vref≤the current measurement value iu≤Vref, −Vref≤the current measurement value iv≤Vref and −Vref≤the current measurement value iw≤Vref, the OR circuit 220 outputs the logic L, and when all of the current measurement values iu, iv, and iw deviate a range from −Vref to Vref, the OR circuit 220 outputs the logic H. Therefore, when all of the magnitudes (absolute values) of the motor currents of u-phase, v-phase and w-phase are equal to or smaller than the threshold value, the OR circuit 220 can output the determination result of the logic L indicative of the same to the short-circuit control unit 155.

Note that, during the short-circuiting operation, when the switching element is in an off-state, the motor current does not substantially flow. However, the current determination unit 145 may also determine whether the motor current flowing through the switching element is equal to or smaller than the threshold value, only for an on-state switching element of the switching elements SWu to SWz. The current determination unit 145 may also set a threshold value specific to each of the switching elements. Thereby, for a switching element having a high withstand voltage, the threshold value of the motor current can be set large.

In the above, the current threshold value may be determined so that a voltage, which is applied to the switching elements SWu to SWz when all-on of the upper arm-side switching elements SWu to SWw and all-on of the lower arm-side switching elements SWx to SWz are switched during the short-circuiting operation, is to be equal to or smaller than a maximum rated voltage of the switching elements SWu to SWz. Here, the current determination unit 145 may include a threshold value setting circuit such as a setting register for setting the positive threshold value voltage Vref and the negative threshold value voltage −Vref, and receive a setting of appropriate values of the positive threshold value voltage Vref and the negative threshold value voltage −Vref, according to models, characteristics and the like of the switching elements SWu to SWz to be adopted.

Figure 3:
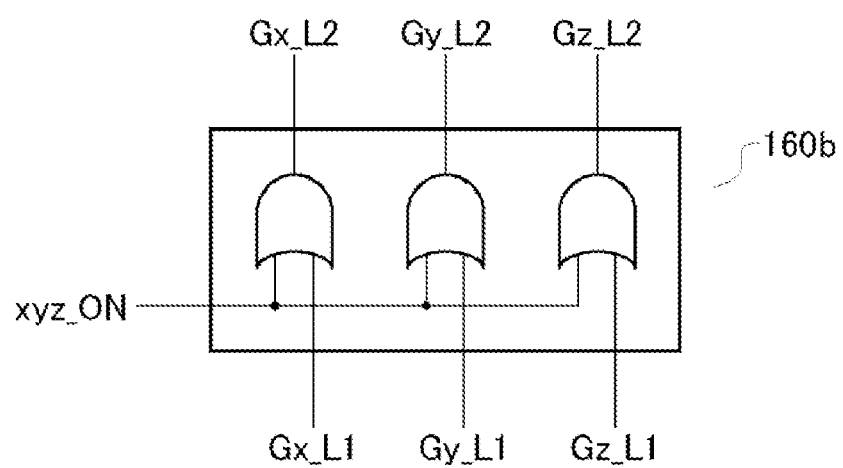
FIG. 3 shows an example of a lower arm control signal generation unit in accordance with the present embodiment.

FIG. 3 shows an example of the lower arm control signal generation unit 160b in accordance with the present embodiment. The lower arm control signal generation unit 160b outputs a logical add of the gate drive command Gx_L1 and the lower arm all-phase on-command xyz_ON to the lower arm drive unit 170b, as the gate drive command Gx_L2, outputs a logical add of the gate drive command Gy_L1 and the lower arm all-phase on-command xyz_ON to the lower arm drive unit 170b, as the gate drive command Gy_L2, and outputs a logical add of the gate drive command Gz_L1 and the lower arm all-phase on-command xyz_ON to the lower arm drive unit 170b, as the gate drive command Gz_L2. Thereby, the lower arm control signal generation unit 160b outputs the gate drive commands Gx_L2 to Gz_L2, which are combinations of the gate drive commands Gx_L1 to Gz_L1 output by the motor control unit 140 during the normal operation and the lower arm all-phase on-command xyz_ON output by the short-circuit control unit 155 during the short-circuiting operation. Note that, since the upper arm control signal generation unit 160a has a similar configuration to the lower arm control signal generation unit 160b, the descriptions thereof are omitted.

Figure 4:
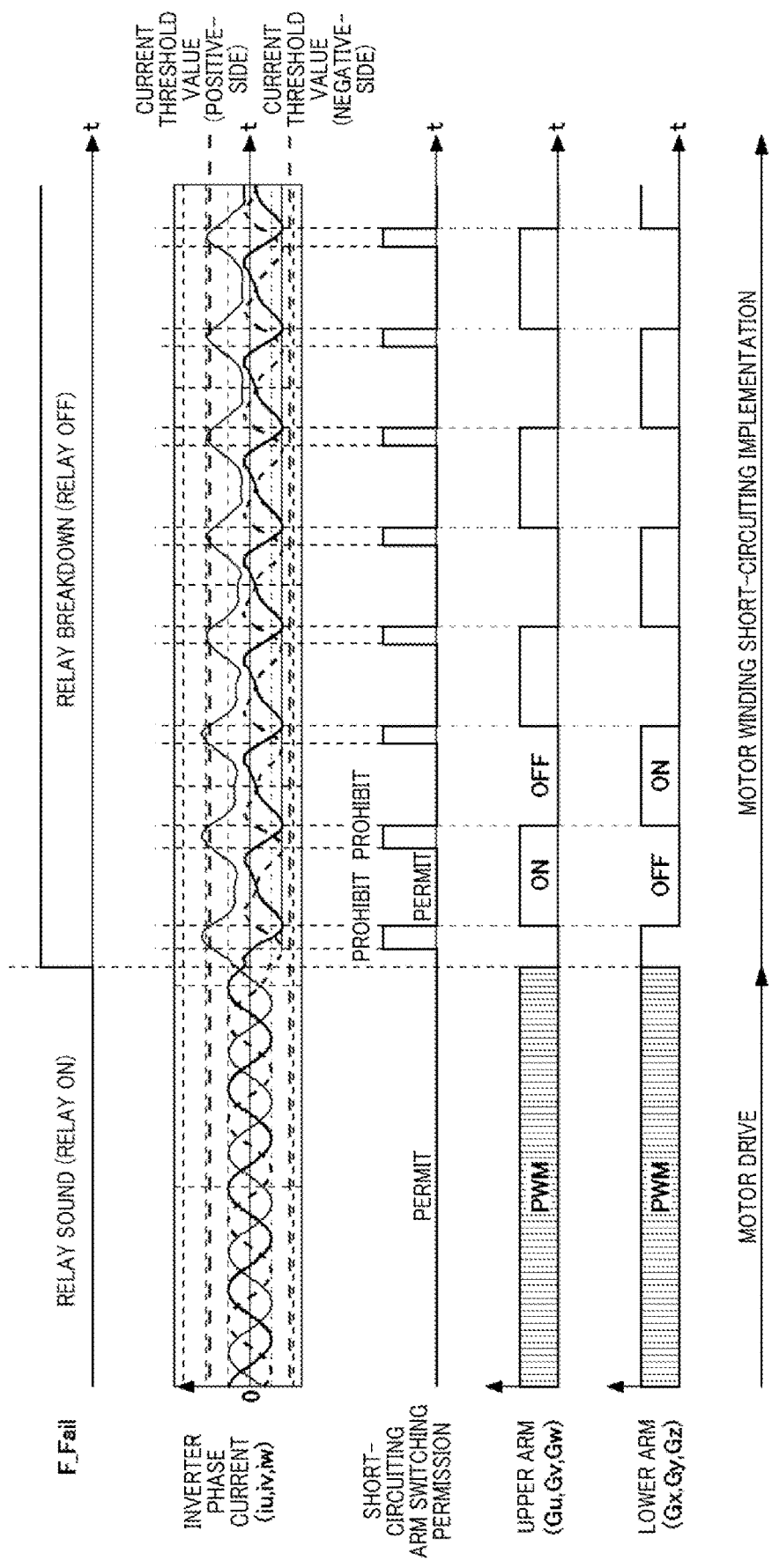
FIG. 4 is a timing chart showing an operation example of the electrical-machinery system in accordance with the present embodiment.

FIG. 4 is a timing chart showing an operation example of the electrical-machinery system in accordance with the present embodiment. In timing charts of FIG. 4, a horizontal axis indicates lapse of time, and a vertical axis indicates time changing waveforms of the fail signal F_Fail, each phase current iu, iv and iw of the inverter 105, the determination result ("short-circuiting arm switching permission" in FIG. 4) of the motor current output by the current determination unit 145, gate voltages Gu to Gw of the upper arm-side switching elements SWu to SWw, and gate voltages Gx to Gz of the lower arm-side switching elements SWx to SWz.

While the relay Ryp is sound and is in a normal relay-on operation, the short-circuit control unit 155 sets the fail signal F_Fail to the logic L. In this case, the motor control unit 140 performs a normal operation, and drives the motor M1 by controlling the gates Gu to Gw of the upper arm-side switching elements SWu to SWw and the gates Gx to Gz of the lower arm-side switching elements SWx to SWz in a pulse width modulation (PWM) manner via the arm control signal generation units 160a and 160b and the arm drive units 170a and 170b. During the control, the motor current having a magnitude equal to or smaller than the threshold value flows through all of the switching elements SWu to SWz, and the current determination unit 145 outputs the determination result of the logic L indicating that switching of the short-circuiting arm is permitted.

When the relay-on signal Ry_ON becomes the logic H and the relay state signal Fp becomes the logic H due to breakdown, falling off or the like of the relay Ryp, the short-circuit condition determination unit 150 determines that the short-circuit condition is satisfied, and instructs the short-circuit control unit 155 to perform the short-circuiting operation. In response to this, the short-circuit control unit 155 sets the fail signal F_Fail to the logic H, and starts the short-circuiting operation. During the short-circuiting operation, the short-circuit control unit 155 alternately sets the upper arm all-phase on-command uvw_ON and the lower arm all-phase on-command xyz_ON to the logic H, and sets the all-phase on-command of the arm-side that is not set to the logic H to the logic L. Thereby, the gates Gu to Gw of the upper arm-side switching elements SWu to SWw and the gates Gx to Gz of the lower arm-side switching elements SWx to SWz become alternately the logic H, so that the upper arm-side switching elements SWu to SWw and the lower arm-side switching elements SWx to SWz become alternately all-on.

Note that, the short-circuit control unit 155 may perform switching of the all-phase short-circuiting arm with a basic period of the motor current. Alternatively, the short-circuit control unit 155 may perform switching of the all-phase short-circuiting arm with a period based on a rotation period of the motor M1, such as a rotation period of the motor M1 detected by the magnetic pole position detector 112, a multiple of the number of phases of the rotation period, and the like. The short-circuit control unit 155 may also perform switching of the all-phase short-circuiting arm with a preset fixed period or adaptively as a temperature of an on-state switching element of the switching elements SWu to SWz becomes equal to or higher than a reference temperature.

Here, when a magnitude of the motor current flowing through at least one of the switching elements SWu to SWz exceeds the current threshold value, the current determination unit 145 outputs the determination result of the logic H indicating that switching of the all-phase short-circuiting arm is prohibited. The short-circuit control unit 155 does not perform switching of the all-phase short-circuiting arm while the switching is prohibited, even when it is a switching timing of the all-phase short-circuiting arm.

According to the electrical-machinery system 100 as described above, in the short-circuiting operation, switching of the all-phase short-circuiting arm is permitted, on condition that the motor current flowing through the switching element is equal to or smaller than the threshold value, and switching of the all-phase short-circuiting arm is prohibited, on condition that the motor current exceeds the threshold value. Thereby, when there is a possibility that a surge voltage exceeding a withstand voltage of the switching element will be generated as the current flowing through the switching element is large and the switching element is thus switched from an on-state to an off-state, the electrical-machinery system 100 can prohibit switching of the all-phase short-circuiting arm to protect the switching element.

Figure 5:
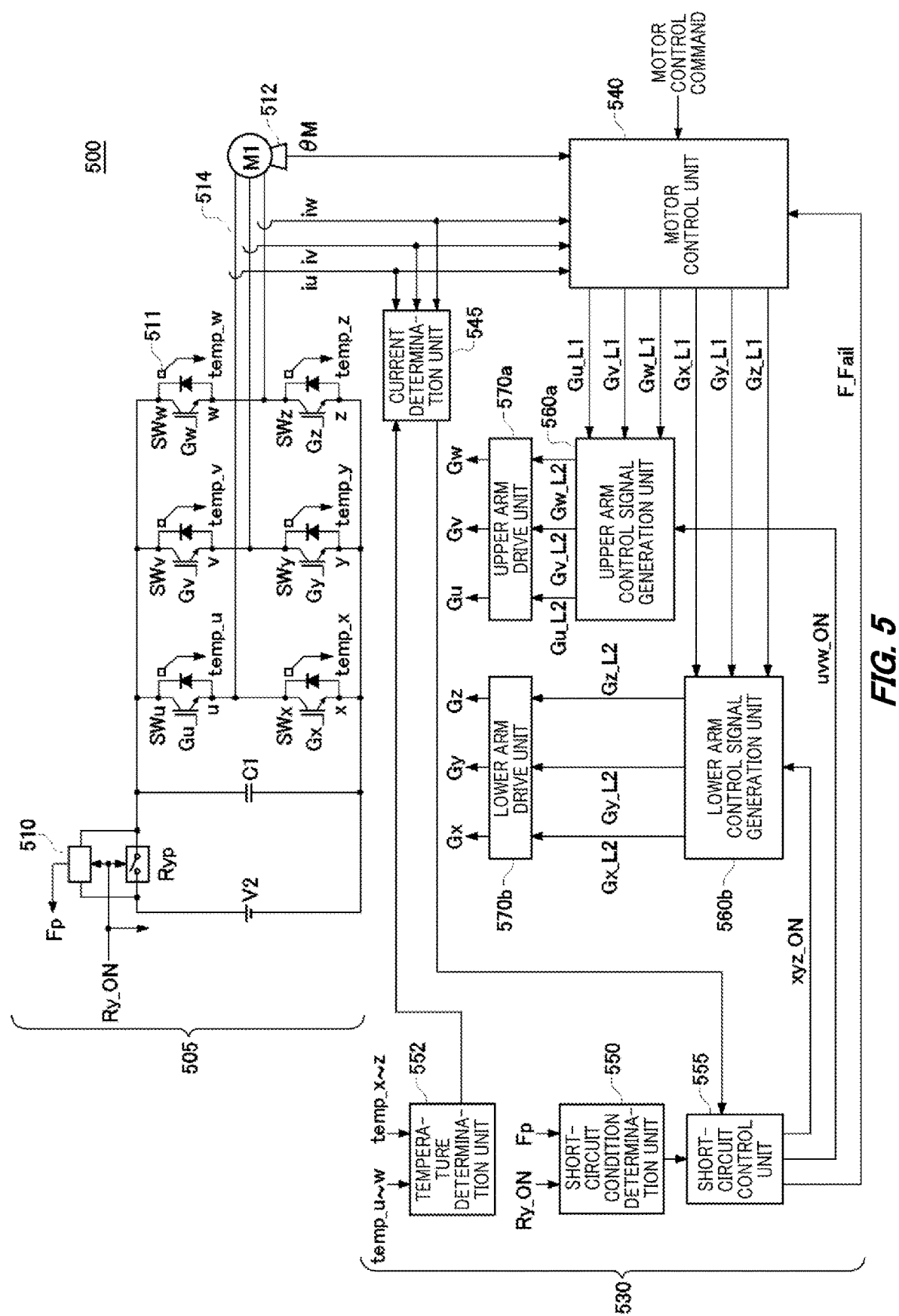
FIG. 5 shows a configuration of an electrical-machinery system in accordance with a modified embodiment of the present embodiment.

FIG. 5 shows a configuration of an electrical-machinery system 500 in accordance with a modified embodiment of the present embodiment. Since the electrical-machinery system 500 is a modified embodiment of the electrical-machinery system 100 shown in FIG. 1, the descriptions except differences are hereinafter omitted.

In general, it is known that a withstand voltage of the switching element is lowered as a temperature becomes lower. There is also a switching element such as an IGBT whose turn-off time is shortened as the temperature becomes lower. Since the switching element cuts off a current I flowing in an on-state to zero during a turn-off time, the shorter the turn-off time is, the larger a transient current change amount dI/dt is. Here, when an inductance of a circuit connected to the switching element is denoted as L, an electromotive force of V=L·dI/dt is generated in the circuit upon turn-off of the switching element, which causes a surge voltage. Therefore, the lower the temperature is, the higher the surge voltage is applied to the switching element.

Therefore, when the temperature of the switching element is low, the electrical-machinery system 500 of the present modified embodiment prohibits switching of the all-phase short-circuiting arm even though the current flowing through the switching element is smaller. In order to realize this, the electrical-machinery system 500 measures a temperature of the switching element, and a current determination unit 545 corresponding to the current determination unit 145 shown in FIG. 1 adjusts the threshold value Vref to be used, according to the temperature of the switching element.

The electrical-machinery system 500 includes a motor M1, an inverter 505, a magnetic pole position detector 512, a current detector 514, and a motor drive device 530. Since the motor M1, the magnetic pole position detector 512 and the current detector 514 are each similar to the motor M1, the magnetic pole position detector 112 and the current detector 114 shown in FIG. 1, the descriptions thereof are omitted.

The inverter 505 includes an electric power source V2, a relay Ryp, a relay state detector 510, a smoothing capacitor C1, upper arm-side switching elements SWu to SWw, and lower arm-side switching elements SWx to SWz. Since these members are each similar to the electric power source V2, the relay Ryp, the relay state detector 110, the smoothing capacitor C1, the upper arm-side switching elements SWu to SWw and the lower arm-side switching elements SWx to SWz shown in FIG. 1, the descriptions thereof are omitted. The inverter 505 of the present modified embodiment further includes a plurality of temperature sensors 511 each added to the switching elements SWu to SWz. The temperature sensor 511 added to the switching element SWu outputs a temperature detection signal temp_u corresponding to a temperature of the switching element SWu. The other switching elements SWv to SWz are also similar. In this way, the plurality of temperature sensors 511 outputs the temperature detection signals temp_u to temp_z corresponding to temperatures of the switching elements SWu to SWz.

The motor drive device 530 includes a motor control unit 540, a current determination unit 545, a short-circuit condition determination unit 550, a temperature determination unit 552, a short-circuit control unit 555, arm control signal generation units 560*a* and 560*b*, and arm drive units 570*a* and 570*b*. Since the motor control unit 540, the short-circuit condition determination unit 550, the short-circuit control unit 555, the arm control signal generation units 560*a* and 560*b* and the arm drive units 570*a* and 570*b* are each similar to the motor control unit 140, the short-circuit condition determination unit 150, the short-circuit control unit 155, the arm control signal generation units 160*a* and 160*b* and the arm drive units 170*a* and 170*b* shown in FIG. 1, the descriptions thereof are omitted.

The temperature determination unit 552 is connected to the plurality of temperature sensors 511 and outputs a temperature detection signal corresponding to a temperature of at least one switching element of the plurality of upper arm-side switching elements SWu to SWw and the plurality of lower arm-side switching elements SWx to SWz to the current determination unit 545. In the present modified embodiment, the temperature determination unit 552 outputs a temperature detection signal corresponding to a minimum temperature of on-state switching elements of the plurality of upper arm-side switching elements SWu to SWw and the plurality of lower arm-side switching elements SWx to SWz to the current determination unit 545. As an example, the temperature determination unit 552 is input with the gate drive commands Gu_L2 to Gz_L2, and outputs a lowest temperature detection signal of the temperature detection signals of the switching elements, which are instructed to be turned on by the gate drive commands, to the current determination unit 545. In a case where the output of the temperature determination unit 552 is used only for the short-circuiting operation, the temperature determination unit 552 may be input with the upper arm all-phase on-command uvw_ON and the lower arm all-phase on-command xyz_ON, and output a lowest temperature detection signal of the temperature detection signals of the switching elements, which are instructed to be turned on by the corresponding commands, to the current determination unit 545.

In a case where the upper arm-side switching element and the lower arm-side switching element of each phase are attached to the same heat radiation plate or the like and become at substantially the same temperature, the electrical-machinery system 500 may also measure temperatures of the upper arm-side switching element and the lower arm-side switching element of each phase by using the common temperature sensor 511, and output a minimum value of the temperature detection signals from the temperature sensors 511 of each phase from the temperature determination unit 552 to the current determination unit 545. In a case where all the switching elements are attached to the same heat radiation plate or the like and become at substantially the same temperature, the electrical-machinery system 500 may measure temperatures of all the switching elements by using the common temperature sensor 511, and output the temperature detection signal from the temperature sensor 511 to the current determination unit 545.

The current determination unit 545 is connected to one or multiple current detectors 514, and determines whether the motor current flowing through at least one switching element of the plurality of upper arm-side switching elements SWu to SWw and the plurality of lower arm-side switching elements SWx to SWz is equal to or smaller than the threshold value. Although the functions of the current determination unit 545 are substantially similar to the current determination unit 145 shown in FIG. 1, the current determination unit 545 of the present modified embodiment further has a function of adjusting the threshold value of the motor current for permitting switching of the all-phase short-circuiting arm, according to the temperature detection signal input from the temperature determination unit 552.

Figure 6:
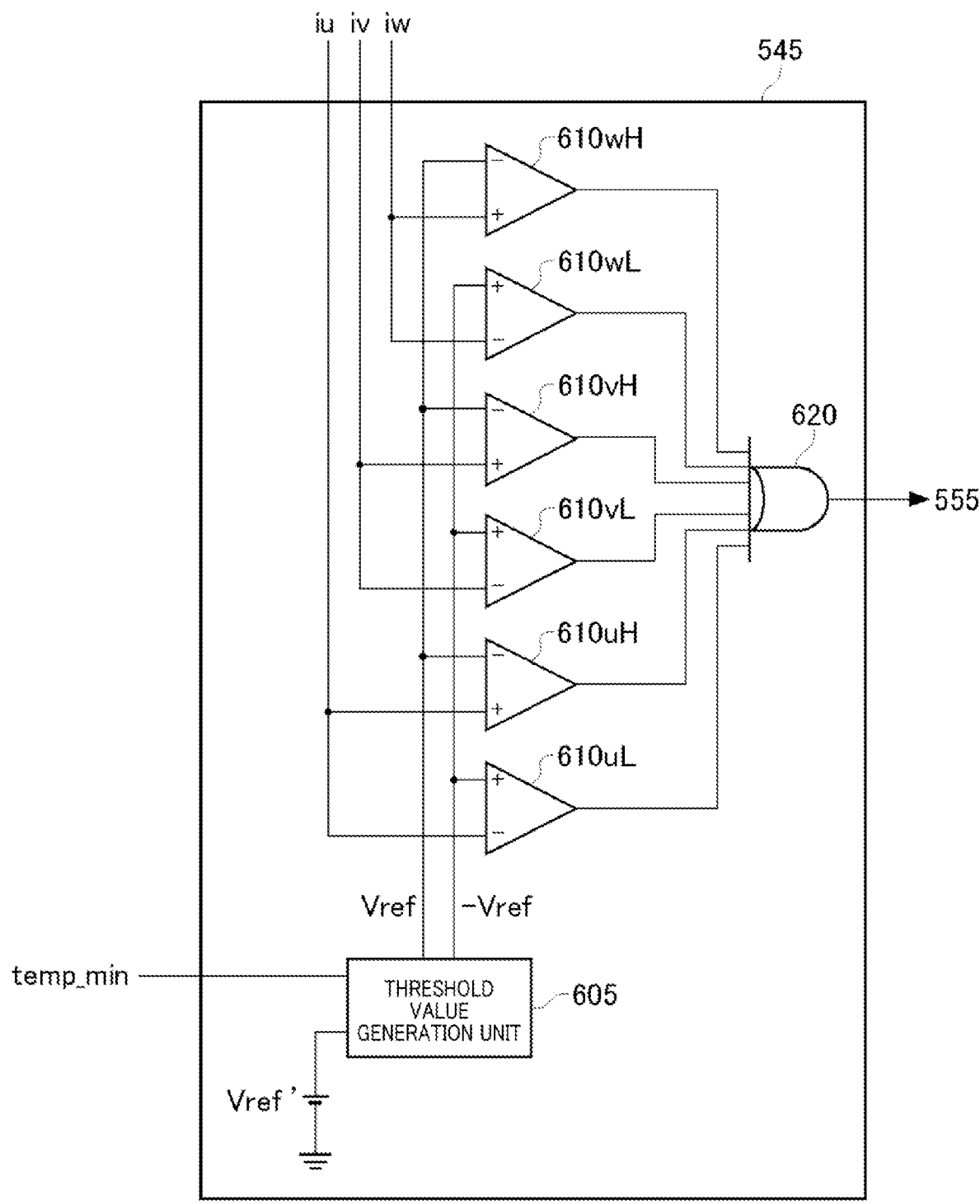
FIG. 6 shows an example of a configuration of a current determination unit in accordance with the modified embodiment of the present embodiment.

FIG. 6 shows an example of a configuration of the current determination unit 545 in accordance with the modified embodiment of the present embodiment. The current determination unit 545 includes a threshold value generation unit 605, a plurality of comparators 610uH to 610wH, a plurality of comparators 610uL to 610wL, and an OR circuit 620. Since the plurality of comparators 610uH to 610wH, the plurality of comparators 610uL to 610wL and the OR circuit 620 are each similar to the plurality of comparators 210uH to 210wH, the plurality of comparators 210uL to 210wL and the OR circuit 220 shown in FIG. 2, the descriptions thereof are omitted.

The threshold value generation unit 605 generates a positive threshold value voltage Vref and a negative threshold value voltage −Vref, based on a temperature detection signal temp_min input from the temperature determination unit 552 and a reference voltage Vref. As an example, the threshold value generation unit 605 calculates the positive threshold value voltage by Vref=Vref+α·temp_min, and the negative threshold value voltage by an inverted value of the positive threshold value voltage Vref. Here, α is a positive coefficient, and is a parameter for determining how much the current threshold value is increased with respect to temperature rise. Thereby, the threshold value generation unit 605 can correct an upper limit threshold value of the motor current at which the all-phase short-circuiting arm may be switched, according to the temperature of the switching element that is switched from an on-state to an off-state. More specifically, the threshold value generation unit 605 may further increase the current threshold value when the temperature indicated by the temperature detection signal from the temperature determination unit 552 is higher.

Figure 7:
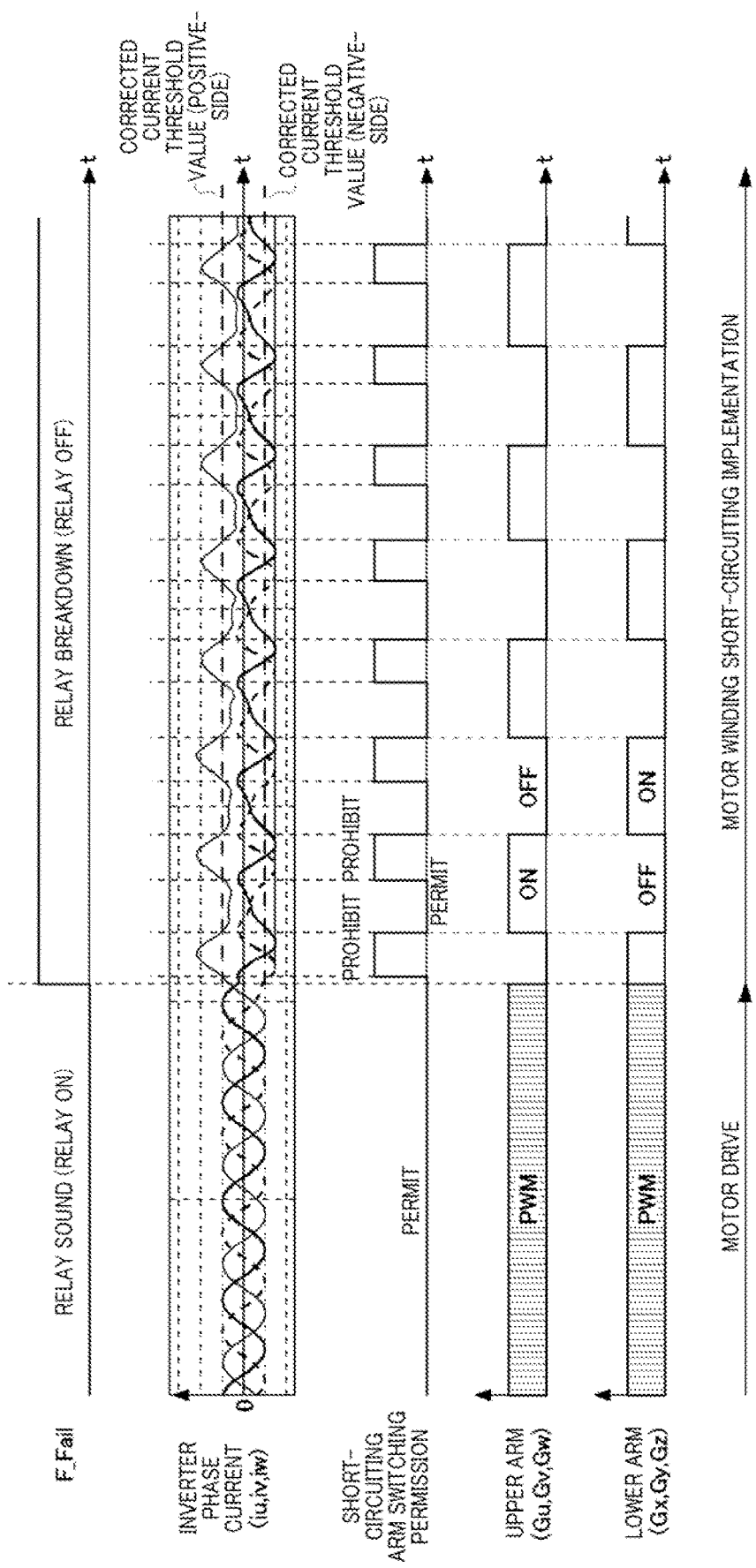
FIG. 7 is a timing chart showing an operation example of the electrical-machinery system in accordance with the modified embodiment of the present embodiment.

FIG. 7 is a timing chart showing an operation example of the electrical-machinery system 500 in accordance with the modified embodiment of the present embodiment. In the timing chart of FIG. 7, the "corrected current threshold value (positive-side)" and the "corrected current threshold value (negative-side)" by the temperature determination unit 552 and the threshold value generation unit 605 are used instead of the "current threshold value (positive-side)" and the "current threshold value (negative-side)" in the timing chart of FIG. 4.

In the timing chart of FIG. 7, during the short-circuiting operation, the temperature of the on-state switching element is low, and the magnitudes (absolute values) of the positive-side and negative-side current threshold values are smaller than the magnitudes of the positive-side and negative-side current threshold values in the timing chart of FIG. 4. For this reason, in the timing chart of FIG. 7, a ratio of the time period for which switching of the all-phase short-circuiting arm is prohibited is larger, as compared to the timing chart of FIG. 4.

According to the electrical-machinery system 500 as described above, when the temperature of the switching element that is switched from an on-state to an off-state is high, the upper limit threshold value of the motor current at which the all-phase short-circuiting arm may be switched can be increased, as compared to a case where the temperature of the switching element is low. Thereby, while protecting the switching element with respect to lowering in withstand voltage of the switching element and increase in surge voltage at low temperatures, it is possible to prolong the time period for which the all-phase short-circuiting arm can be switched, after the temperature of the switching element rises.

Figure 8:
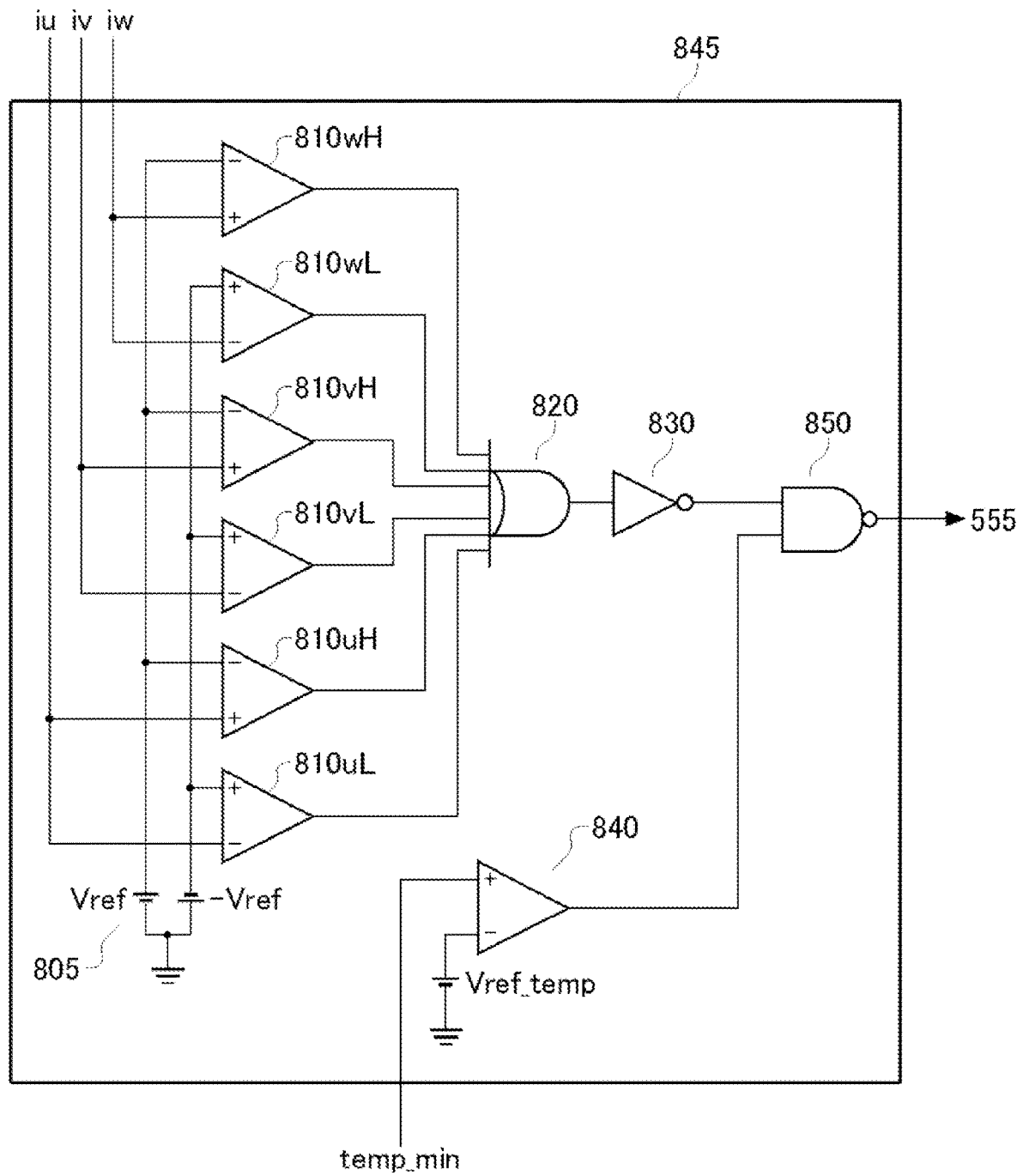
FIG. 8 shows an example of a configuration of a current determination unit in accordance with a second modified embodiment of the present embodiment.

FIG. 8 shows an example of a configuration of a current determination unit 845 in accordance with a second modified embodiment of the present embodiment. In the present modified embodiment, the electrical-machinery system 500 includes a current determination unit 845, instead of the current determination unit 545. In the electrical-machinery system 500 modified in this way, since the members other than the current determination unit 845 have the similar functions and configurations to the electrical-machinery system 500 shown in FIG. 5, the descriptions except differences are hereinafter omitted.

The current determination unit 845 is connected to one or multiple current detector 514, and determines whether the motor current flowing through at least one switching element of the plurality of upper arm-side switching elements SWu to SWw and the plurality of lower arm-side switching elements SWx to SWz is equal to or smaller than the threshold value. Here, during the short-circuiting operation, the current determination unit 845 outputs the determination result of the logic H indicating that switching of the all-phase short-circuiting arm is prohibited, on condition that the temperature of at least one switching element of the plurality of upper arm-side switching elements and the plurality of lower arm-side switching elements is equal to or lower than the reference temperature. Thereby, the short-circuit control unit 555 may not perform the switching, in the short-circuiting operation, on condition that the temperature of at least one switching element of the plurality of upper arm-side switching elements and the plurality of lower arm-side switching elements is equal to or lower than the reference temperature.

The current determination unit 845 includes a threshold value generation unit 805, a plurality of comparators 810$u$H to 810$w$H, a plurality of comparators 810$u$L to 810$w$L, an OR circuit 820, a NOT circuit 830, a comparator 840, and a NAND circuit 850. Since the threshold value generation unit 805, the plurality of comparators 810$u$H to 810$w$H, the plurality of comparators 810$u$L to 810$w$L and the OR circuit 820 are each similar to the threshold value generation unit 205, the plurality of comparators 210$u$H to 210$w$H, the plurality of comparators 210$u$L to 210$w$L and the OR circuit 220 shown in FIG. 2, the descriptions thereof are omitted.

As described with respect to FIG. 2, the OR circuit 820 corresponding to the OR circuit 220 shown in FIG. 2 outputs the determination result of the logic L when the magnitudes (absolute values) of the motor currents of u-phase, v-phase and w-phase are all equal to or smaller than the threshold value. The NOT circuit 830 inverts the output of the OR circuit 820, and outputs the logic H when the magnitudes (absolute values) of the motor currents of u-phase, v-phase and w-phase are all equal to or smaller than the threshold value.

A temperature detection signal temp_min from the temperature determination unit 552 is input to a positive-side terminal of the comparator 840, and a threshold value voltage Vref_temp corresponding to the reference temperature is input to a negative-side terminal. Thereby, the comparator 840 outputs the logic H when the temperature determined by the temperature determination unit 552 exceeds the reference temperature (i.e., temp_min>Vref_temp), and outputs the logic L when the temperature is equal to or lower than the reference temperature (i.e., temp_min≤Vref_temp).

The NAND circuit 850 outputs a negative logic product of an output of the NOT circuit 830 and an output of the comparator 840, as the determination result of the current determination unit 845. The NAND circuit 850 outputs the logic L indicating that switching of the all-phase short-circuiting arm is permitted, when all of the output of the NOT circuit 830 and the output of the comparator 840 are the logic H, i.e., the magnitudes (absolute values) of the motor currents of u-phase, v-phase and w-phase are all equal to or smaller than the threshold value and the temperature determined by the temperature determination unit 552 exceeds the reference temperature. When at least one of the output of the NOT circuit 830 and the output of the comparator 840 is the logic L, the logic H is output which indicates that switching of the all-phase short-circuiting arm is prohibited.

Figure 9:
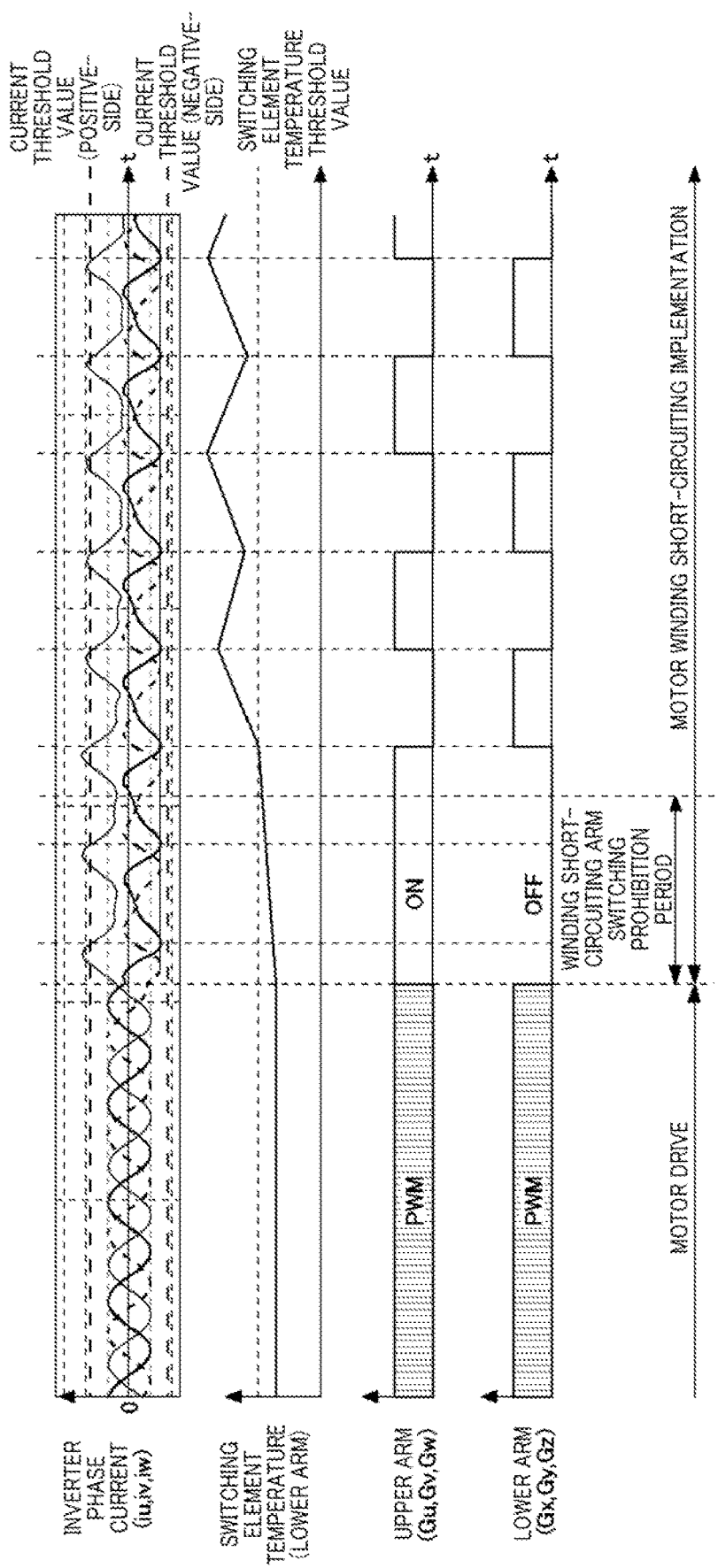
FIG. 9 is a timing chart showing an operation example of the electrical-machinery system in accordance with the second modified embodiment of the present embodiment.

The short-circuit control unit 555 that receives the determination result of the current determination unit 845 does not perform switching of the all-phase short-circuiting arm, on condition that the temperature of at least one switching element of the plurality of upper arm-side switching elements SWu to SWw and the plurality of lower arm-side switching elements SWx to SWz is equal to or lower than the reference temperature, in the short-circuiting operation. In the present modified embodiment, as shown in FIG. 9, the short-circuit control unit 555 does not perform the switching, on condition that the minimum temperature of the on-state switching element of the plurality of upper arm-side switching elements SWu to SWw and the plurality of lower arm-side switching elements SWx to SWz is equal to or lower than the reference temperature, in the short-circuiting operation.

By using the current determination unit 845 as described above, the electrical-machinery system 500 can protect the switching element by prohibiting switching of the all-phase short-circuiting arm, in a situation where the temperature of the on-state switching element is equal to or lower than the reference temperature, a withstand voltage of the switching element is low and a high surge voltage may be generated.

Note that, the current determination unit 845 may also adopt the threshold value generation unit 605, instead of the threshold value generation unit 805. The current determination unit 845 modified in this way can prohibit switching of the all-phase short-circuiting arm when the temperature of the on-state switching element is equal to or lower than the reference temperature, and increase the upper limit threshold value of the motor current at which switching of the all-phase short-circuiting arm is permitted as the temperature of the switching element rises, even when the temperature of the on-state switching element exceeds the reference temperature.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor or programmable circuitry of a programmable data processing apparatus such as a general purpose computer, a special purpose computer, or other computers, locally or via a local area network (LAN), wide area network (WAN) such as the Internet, and the computer-readable instructions may be executed to create means for performing operations specified in the flowcharts or block diagrams. Examples of the processor include a computer processor, a processing unit, a microprocessor, a digital signal processor, a controller, a microcontroller, and the like.

Figure 10:
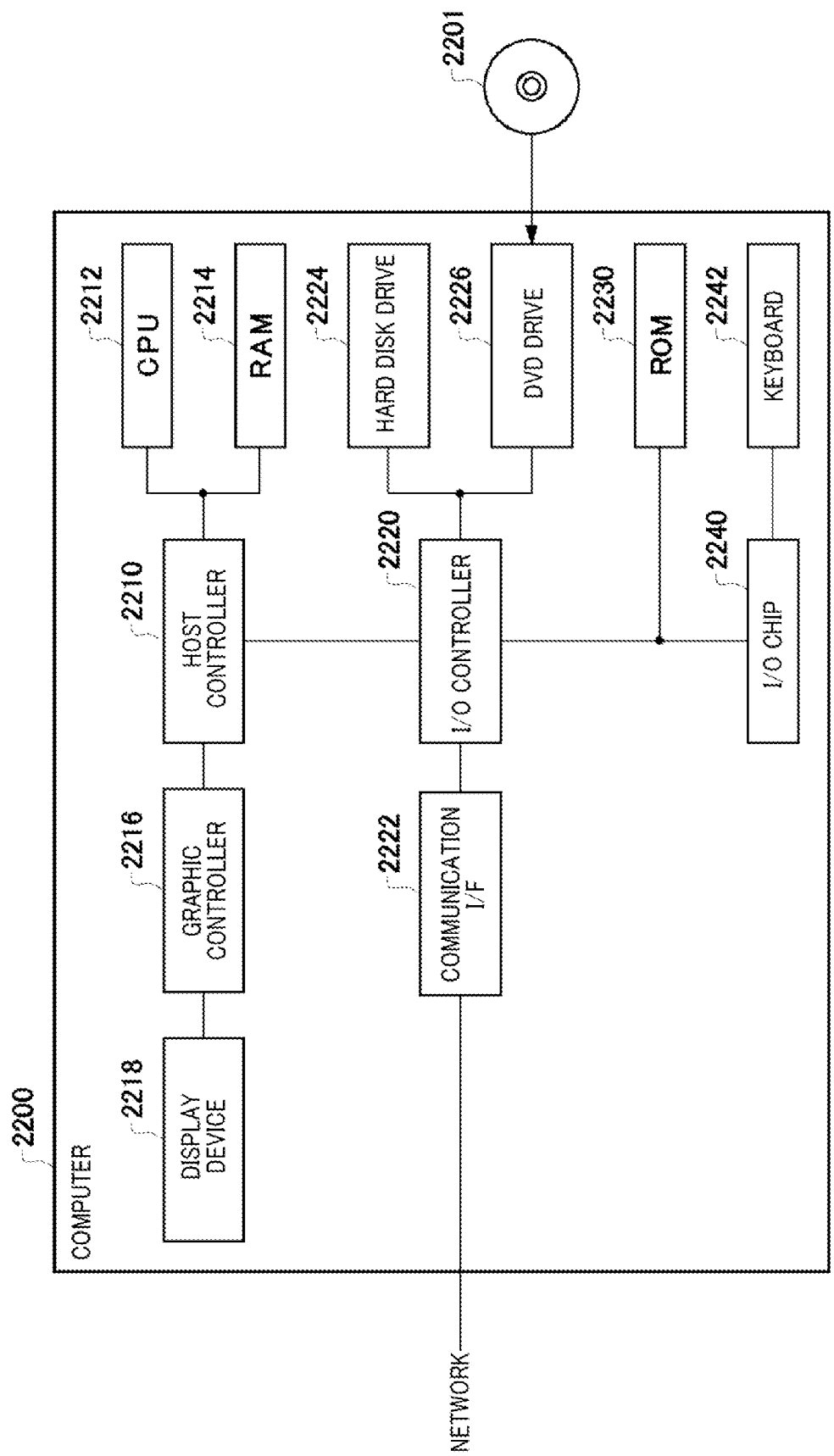
FIG. 10 shows an example of a configuration of a computer in accordance with the present embodiment.

FIG. 10 shows an example of a computer 2200 in which a plurality of aspects of the present invention can be entirely or partially embodied. A program that is installed in the computer 2200 can cause the computer 2200 to function as one or more "sections" in an operation or an apparatus associated with the embodiment of the present invention, or cause the computer 2200 to perform the operation or the one or more sections thereof, and/or cause the computer 2200 to perform processes of the embodiment of the present invention or steps thereof. Such a program may be performed by a CPU 2212 so as to cause the computer 2200 to perform certain operations associated with some or all of the blocks of flowcharts and block diagrams described herein.

The computer 2200 in accordance with the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on a display device 2218.

The communication interface 2222 performs communication with other electronic devices via a network. The hard disk drive 2224 stores programs and data that are used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like that is performed by the computer 2200 at the time of activation, and/or a program depending on the hardware of the computer 2200. The input/output chip 2240 may also connect various input/output units to the input/output controller 2220 via a parallel port, a serial port, a keyboard port, a mouse port or the like.

A program is provided by computer readable media such as the DVD-ROM 2201 or the IC card. The program is read from the computer readable media, installed into the hard disk drive 2224, RAM 2214, or ROM 2230, which are also examples of computer readable media, and performed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may perform a communication program loaded onto the RAM 2214 to instruct communication processing to the communication interface 2222, based on the processing described in the communication program. The communication interface 2222, under control of the CPU 2212, reads transmission data stored on a transmission buffer region provided in a recording medium such as the RAM 2214, the hard disk drive 2224, the DVD-ROM 2201, or the IC card, and transmits the read transmission data to a network or writes reception data received from a network into a reception buffer region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the billings, embodiments, or diagrams can be performed in any order as long as the order is not indicated by "prior to," "before," or the like and as long as the output from a previous process is not used in a later process. Even if the process flow is described using phrases such as "first" or "next" in the billings, embodiments, or diagrams, it does not necessarily mean that the process must be performed in this order.

What is claimed is:

1. A motor drive device comprising:
a motor control unit for controlling a plurality of upper arm-side switching elements and a plurality of lower arm-side switching elements provided to an inverter for driving a motor;
a current determination unit for determining whether a motor current flowing through at least one switching element of the plurality of upper arm-side switching elements and the plurality of lower arm-side switching elements is equal to or smaller than a threshold value; and
a short-circuit control unit for performing switching between all-on of the plurality of upper arm-side switching elements and all-on of the plurality of lower arm-side switching elements, on condition that the motor current is equal to or smaller than the threshold value, in a short-circuiting operation of alternately switching all-on of the plurality of upper arm-side switching elements and all-on of the plurality of lower arm-side switching elements.

2. The motor drive device according to claim 1, wherein the short-circuit control unit is configured not to perform the switching, on condition that the motor current exceeds the threshold value, in the short-circuiting operation.

3. The motor drive device according to claim 2, wherein the current determination unit is configured to determine whether the motor current flowing through all the switching elements of the plurality of upper arm-side switching elements and the plurality of lower arm-side switching elements is equal to or smaller than the threshold value.

4. The motor drive device according to claim 2, wherein the short-circuit control unit is configured not to perform the switching, on condition that a temperature of at least one switching element of the plurality of upper arm-side switching elements and the plurality of lower arm-side switching elements is equal to or lower than a reference temperature, in the short-circuiting operation.

5. The motor drive device according to claim 2, wherein the current determination unit is configured to set the threshold value higher when a temperature of at least one switching element of the plurality of upper arm-side switching elements and the plurality of lower arm-side switching elements is higher.

6. The motor drive device according to claim 2, wherein the current determination unit is configured to determine whether the motor current flowing through a wire between the inverter and the motor is equal to or smaller than the threshold value.

7. The motor drive device according to claim 1, wherein the current determination unit is configured to determine whether the motor current flowing through all the switching elements of the plurality of upper arm-side switching elements and the plurality of lower arm-side switching elements is equal to or smaller than the threshold value.

8. The motor drive device according to claim 7, wherein the short-circuit control unit is configured not to perform the switching, on condition that a temperature of at least one switching element of the plurality of upper arm-side switching elements and the plurality of lower arm-side switching elements is equal to or lower than a reference temperature, in the short-circuiting operation.

9. The motor drive device according to claim 7, wherein the current determination unit is configured to set the threshold value higher when a temperature of at least one switching element of the plurality of upper arm-side switching elements and the plurality of lower arm-side switching elements is higher.

10. The motor drive device according to claim 7, wherein the current determination unit is configured to determine whether the motor current flowing through a wire between the inverter and the motor is equal to or smaller than the threshold value.

11. The motor drive device according to claim 1, wherein the short-circuit control unit is configured not to perform the switching, on condition that a temperature of at least one switching element of the plurality of upper arm-side switching elements and the plurality of lower arm-side switching elements is equal to or lower than a reference temperature, in the short-circuiting operation.

12. The motor drive device according to claim 11, wherein the short-circuit control unit is configured not to perform the switching, on condition that a minimum temperature of on-state switching elements of the plurality of upper arm-side switching elements and the plurality of lower arm-side switching elements is equal to or lower than the reference temperature, in the short-circuiting operation.

13. The motor drive device according to claim 12, wherein
the current determination unit is configured to set the threshold value higher when a temperature of at least one switching element of the plurality of upper arm-side switching elements and the plurality of lower arm-side switching elements is higher.

14. The motor drive device according to claim 11, wherein the current determination unit is configured to set the threshold value higher when a temperature of at least one switching element of the plurality of upper arm-side switching elements and the plurality of lower arm-side switching elements is higher.

15. The motor drive device according to claim 11, wherein the current determination unit is configured to determine whether the motor current flowing through a wire between the inverter and the motor is equal to or smaller than the threshold value.

16. The motor drive device according to claim 1, wherein the current determination unit is configured to set the threshold value higher when a temperature of at least one switching element of the plurality of upper arm-side switching elements and the plurality of lower arm-side switching elements is higher.

17. The motor drive device according to claim 16, wherein
the current determination unit is configured to set the threshold value higher when a minimum temperature of on-state switching elements of the plurality of upper arm-side switching elements and the plurality of lower arm-side switching elements is higher.

18. The motor drive device according to claim 1, wherein the current determination unit is configured to determine whether the motor current flowing through a wire between the inverter and the motor is equal to or smaller than the threshold value.

19. A motor drive method comprising:
controlling a plurality of upper arm-side switching elements and a plurality of lower arm-side switching elements provided to an inverter for driving a motor;
determining whether a motor current flowing through at least one switching element of the plurality of upper arm-side switching elements and the plurality of lower arm-side switching elements is equal to or smaller than a threshold value; and
performing switching between all-on of the plurality of upper arm-side switching elements and all-on of the plurality of lower arm-side switching elements, on condition that the motor current is equal to or smaller than the threshold value, in a short-circuiting operation of alternately switching all-on of the plurality of upper arm-side switching elements and all-on of the plurality of lower arm-side switching elements.

20. A computer-readable medium having recorded thereon a motor drive program that, when executed by a computer, causes the computer to function as:
a motor control unit for controlling a plurality of upper arm-side switching elements and a plurality of lower arm-side switching elements provided to an inverter for driving a motor;
a current determination unit for determining whether a motor current flowing through at least one switching element of the plurality of upper arm-side switching elements and the plurality of lower arm-side switching elements is equal to or smaller than a threshold value; and
a short-circuit control unit for performing switching between all-on of the plurality of upper arm-side switching elements and all-on of the plurality of lower arm-side switching elements, on condition that the motor current is equal to or smaller than the threshold value, in a short-circuiting operation of alternately switching all-on of the plurality of upper arm-side switching elements and all-on of the plurality of lower arm-side switching elements.

* * * * *